US010804766B1

(12) United States Patent
Siddiqui et al.

(10) Patent No.: US 10,804,766 B1
(45) Date of Patent: Oct. 13, 2020

(54) HYBRID/ELECTRIC VEHICLE TRANSMISSION

(71) Applicant: Ford Global Technologies, LLC, Dearborn, MI (US)

(72) Inventors: Siraj Siddiqui, Lasalle (CA); Cyrille Goldstein, Ferndale, MI (US); William David Guarino, Dearborn, MI (US); Michael Coury, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 16/381,493

(22) Filed: Apr. 11, 2019

(51) Int. Cl.
| | |
|---|---|
| H02K 5/24 | (2006.01) |
| H02K 1/18 | (2006.01) |
| H02K 7/00 | (2006.01) |
| B60L 50/60 | (2019.01) |
| B60K 6/26 | (2007.10) |
| H02K 5/04 | (2006.01) |
| H02K 5/00 | (2006.01) |

(52) U.S. Cl.
CPC ............... H02K 5/24 (2013.01); H02K 1/185 (2013.01); H02K 7/006 (2013.01); B60K 6/26 (2013.01); B60L 50/60 (2019.02); B60Y 2200/91 (2013.01); B60Y 2200/92 (2013.01); B60Y 2400/60 (2013.01); H02K 5/00 (2013.01); H02K 5/04 (2013.01)

(58) Field of Classification Search
CPC ............ H02K 1/185; H02K 5/00; H02K 5/04; H02K 5/22; H02K 5/24; H02K 7/006; B60K 6/26; B60L 50/60; B60Y 2200/91; B60Y 2200/92; B60Y 2400/60

USPC ..................................................... 310/51, 89
See application file for complete search history.

(56) References Cited

U.S. PATENT DOCUMENTS

| | | | |
|---|---|---|---|
| 2007/0130752 A1 | 6/2007 | Hashimoto et al. | |
| 2012/0242186 A1* | 9/2012 | Hattori ................... | H02K 1/185 310/216.118 |
| 2014/0035415 A1* | 2/2014 | Hattori ................... | H02K 51/00 310/113 |

(Continued)

FOREIGN PATENT DOCUMENTS

JP       2007306751 A    * 11/2007

OTHER PUBLICATIONS

Hattori et al., English Machine Translation of JP2007306751A, Nov. 2007 (Year: 2007).*

*Primary Examiner* — Tulsidas C Patel
*Assistant Examiner* — Rashad H Johnson
(74) *Attorney, Agent, or Firm* — David Kelley; Brooks Kushman P.C.

(57) ABSTRACT

A vehicle transmission includes a housing, an electric machine stator, a support plate, and a plurality of fasteners. The housing has an internal rear wall and a side wall that define a cavity. The electric machine stator is disposed within the cavity. The support plate is disposed within the cavity. The support plate engages the internal side wall such that a press-fit engagement is formed between the support plate and the internal side wall. The electric machine is disposed between the support plate and the internal rear wall. The plurality of fasteners extends through the support plate, through the stator, and engages the rear internal wall to secure the stator to the housing.

20 Claims, 4 Drawing Sheets

(56) References Cited

U.S. PATENT DOCUMENTS

| | | | |
|---|---|---|---|
| 2014/0175927 A1* | 6/2014 | Hattori | H02K 16/00 |
| | | | 310/112 |
| 2015/0249368 A1* | 9/2015 | Naito | H02K 1/185 |
| | | | 310/216.113 |
| 2016/0134169 A1 | 5/2016 | Han et al. | |
| 2017/0120899 A1 | 5/2017 | Sugimoto et al. | |
| 2017/0141628 A1* | 5/2017 | Nose | H02K 1/185 |
| 2019/0131829 A1* | 5/2019 | Hino | H02K 1/16 |
| 2019/0149022 A1* | 5/2019 | Hino | H02K 15/026 |
| | | | 310/195 |

* cited by examiner

HYBRID/ELECTRIC VEHICLE TRANSMISSION

TECHNICAL FIELD

The present disclosure relates to transmissions for hybrid/electric vehicles that include an electric machine such as a motor, generator, or combination motor/generator.

BACKGROUND

Hybrid and/or electric vehicles may include electric machines that are disposed within a housing, such as a transmission or transaxle housing.

SUMMARY

A vehicle transaxle includes a housing, an electric machine stator, a support plate, and fasteners. The housing has first and second internal walls that define a cavity. The electric machine stator is disposed within the cavity. The support plate is disposed within the cavity and engages the first internal wall. The stator is disposed between the support plate and the second internal wall. The fasteners extend through the support plate, through the stator, and engage the second internal wall to secure the stator to the housing.

A vehicle transmission includes a housing, an electric machine stator, a support plate, and a plurality of fasteners. The housing has an internal rear wall and a side wall that define a cavity. The electric machine stator is disposed within the cavity. The support plate is disposed within the cavity. The support plate engages the internal side wall such that a press-fit engagement is formed between the support plate and the internal side wall. The electric machine is disposed between the support plate and the internal rear wall. The plurality of fasteners extends through the support plate, through the stator, and engages the rear internal wall to secure the stator to the housing.

A vehicle transmission includes a stator, a support plate, and a housing. The stator and the support plate are each disposed within a transmission housing. A first longitudinal end of the stator is secured to a first internal wall within the housing. A second longitudinal end of the stator is secured to the support plate. An outer periphery of the support plate is secured to a second internal wall within the housing.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
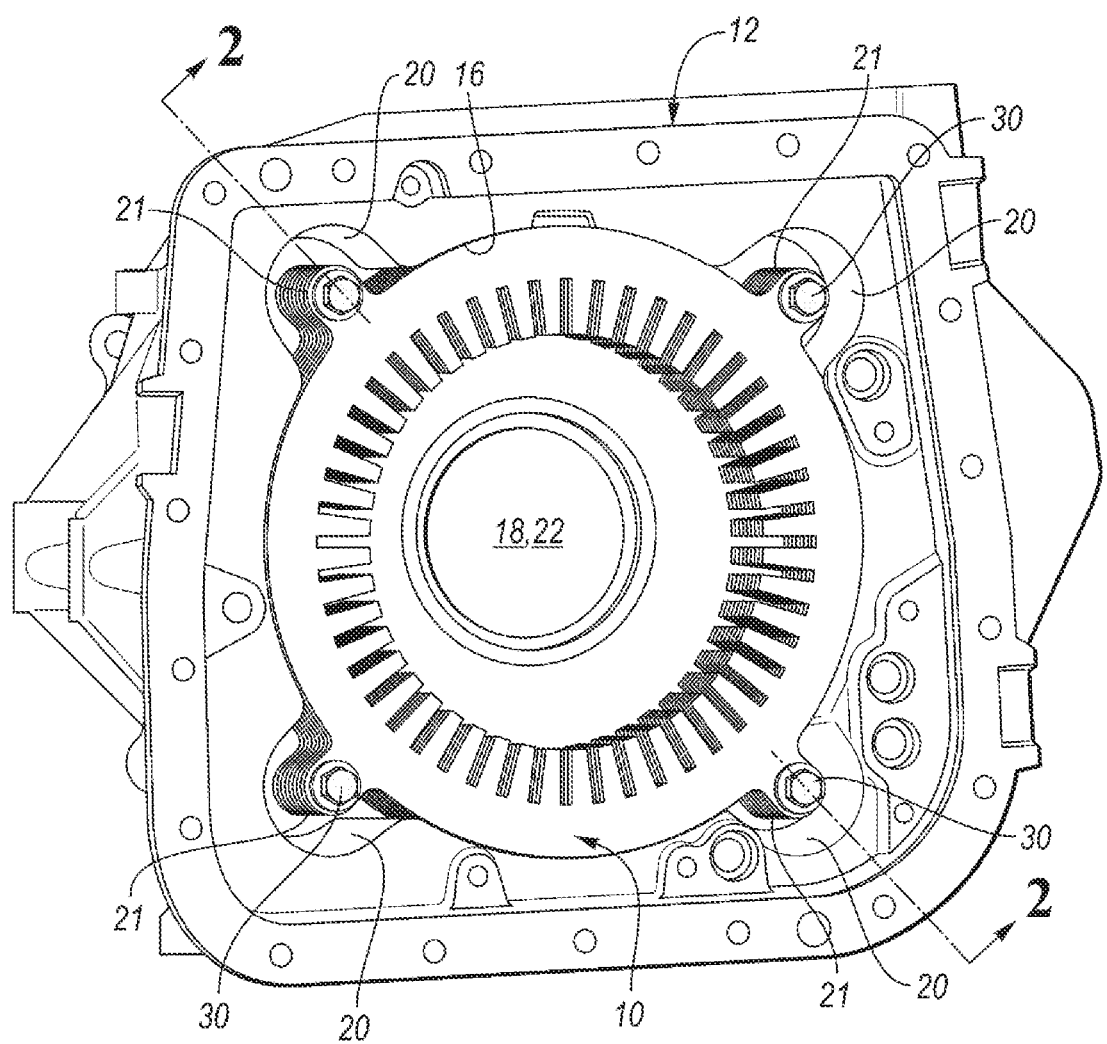
FIG. 1 is a front isometric view of an electric machine stator that is disposed within a housing illustrating a first mounting arrangement for the electric machine stator.
Figure 2:
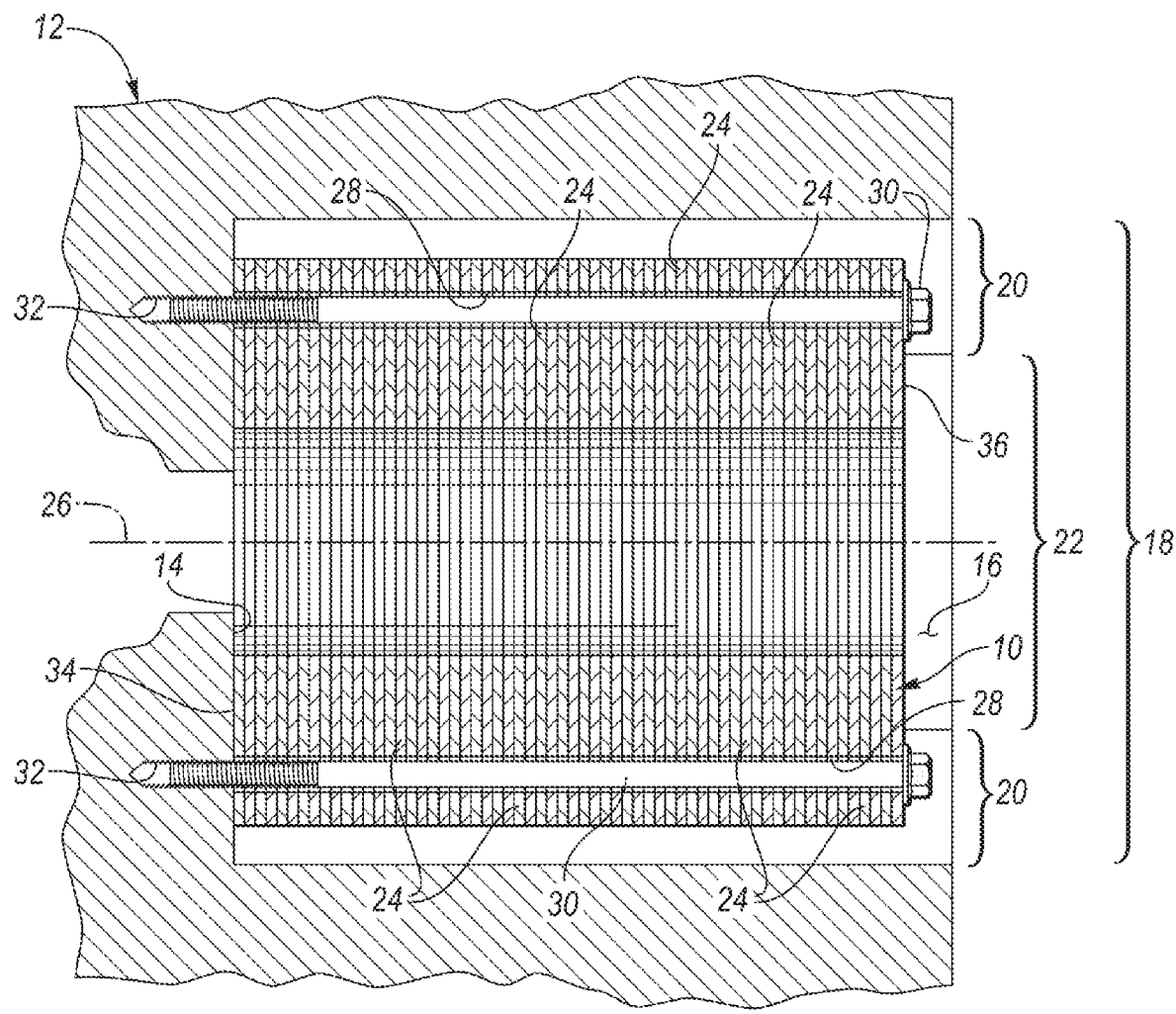
FIG. 2 is a cross-sectional view taken alone line 2-2 in FIG. 1.

Referring to FIGS. 1 and 2, a front isometric view of an electric machine stator 10 that is disposed within a housing 12 and a cross-sectional view taken along line 2-2 in FIG. 1 are illustrated, respectively. More specifically, FIGS. 1 and 2 illustrate a first and/or conventional mounting arrangement for the electric machine stator 10.

The electric machine stator 10 and the housing 12 may be subcomponents of a vehicle. More specifically, the electric machine stator 10 and the housing 12 may be subcomponents of a vehicle powertrain that is configured to deliver power to wheels to propel the vehicle. The housing 12 may be a transmission or transaxle housing that contains transmission and/or transaxle components such as gear sets, clutches, brakes, differentials, driveshafts, half shafts, etc. The gear sets may be selectively placed in different gear ratios by selective engagement of friction elements, such as the clutches and brakes, to establish desired multiple discrete or step drive ratios.

The electric machine stator 10 may be the stator of an electric machine that includes both a stator and a rotor. The electric machine may draw power from a battery and operate as a motor to provide a driving force for the powertrain of the vehicle. Alternatively, the electric machine may operate as a generator and convert kinetic energy from the powertrain of the vehicle into electric energy to be stored in the battery or to power other electrical components within the vehicle. If the vehicle is a hybrid vehicle that includes an additional power source, such as an internal combustion engine, the electric machine may operate as a generator while the other power source is providing propulsion power for the vehicle, for example. The electric machine may additionally operate as a generator during times of regenerative braking in which torque and rotational energy or power from spinning drive wheels of the vehicle is transferred back through the powertrain and to the electric machine, which then converts the rotational energy into electrical energy, which may then be stored within the battery or to power other electrical components within the vehicle.

In the first and/or conventional mounting arrangement for the electric machine stator 10, the housing 12 includes an internal rear wall 14 and an internal side wall 16 that define a cavity 18. The internal rear wall 14 and the internal side wall 16 may be referred to as the first and second internal walls, respectively, or vice versa. The internal rear wall 14 may be a flat and substantially planar wall while the internal side wall 16 may be cylindrical in shape. Substantially planar may include a flat surface that ranges from a perfectly flat along a designated flat plane to a flat surface that includes deviations of up to 3 mm from such a designated flat plane. The internal rear wall 14 and the internal side wall 16 may be substantially perpendicular to each other. Substantially perpendicular may include any incremental value between 80° and 100°. The cavity 18 may also include lobes 20 that extend radially outward from a central portion 22 of the cavity 18. The lobes 20 may be defined by the internal side wall 16. The lobes 20 provide clearance for radially outward extending protrusions 21 of the electric machine stator 10 that define through holes that are configured to received fasteners (see 28 and 30 below).

The electric machine stator 10 may be comprised of a plurality of laminate plates 24 that are sequentially stacked in an axial direction along an axis of rotation 26 of the rotor (not shown) of the electric machine. The laminate plates 24 are individually fabricated from a material such iron or steel. The laminate plates 24 are then aligned in an axial direction along the axis of rotation 26 to form the core of the electric machine stator 10. The electric machine stator 10 also includes coil windings that are not depicted in the Figures for simplicity purposes. The laminate plates 24 may be stacked "loose", welded, or bonded together depending the desired application. The laminate plates 24 may include a thin layer of insulating material (e.g., a thin layer of epoxy that is approximately 0.001 mm thick). Although not depicted in FIGS. 1 and 2, there may be small spaces between adjacent laminate plates 24 at locations where the adjacent laminate plates 24 are not affixed to each other, if the application requires the adjacent laminate plates 24 to be affixed to each other (i.e., via welding or bonding).

The laminate plates 24 of the electric machine stator 10 may define a plurality of through holes 28 that are each configured to receive one of a plurality of fasteners 30. The internal rear wall 14 of the housing 12 may define a plurality of tapped holes 32 that are each configured to align with one of the plurality of through holes 28 and engage the one of the fasteners 30. More specifically, each of the fasteners 30 may extend through one of the through holes 28 and engage one of the tapped holes 32 to secure the electric machine stator 10 to the housing 12 and within the cavity 18. The fasteners 30 may also function to properly align the plurality of laminate plates 24 to form the core of the electric machine stator 10 if the application requires the adjacent laminate plates 24 to be stacked in a "loose" configuration.

In the first and/or conventional mounting arrangement for the electric machine stator 10 depicted in FIGS. 1 and 2, the fasteners 30 secure the electric machine stator 10 to the housing 12 and within the cavity 18 in cantilevered fashion (i.e., a first longitudinal end 34 of the electric machine stator 10 along the axis of rotation 26 is secured to the housing 12 while a second longitudinal end 36 of the electric machine stator 10 along the axis of rotation 26 is not secured to any static component that is grounded or anchored to the housing 12), which may lead to undesirable noise, vibration, or harshness (NVH) issues. Therefore, in order reduce or eliminate any undesirable NVH issues, it may be desirable to support the electric machine stator 10 on both longitudinal ends 34, 36 to increase the stiffness of the electric machine stator 10, which in turn will reduce or eliminate any undesirable NVH issues. It is also desirable to ensure that there is no additional stress is induced within the core of the electric machine stator 10 as a result of adding a mechanism that mounts both ends of the electric machine stator 10 to the housing 12. Insufficient stiffness will result in undesired noise and vibrations, while additional stress on the core of the electric machine stator 10 will result in core losses, which in turn reduces the efficiency of the electric machine. Reduced efficiency decreases the range that electric or hybrid vehicles may utilize the electric machine for propulsion and decreases the fuel economy in hybrid vehicles that utilize the electric machine for propulsion.

Figure 3:
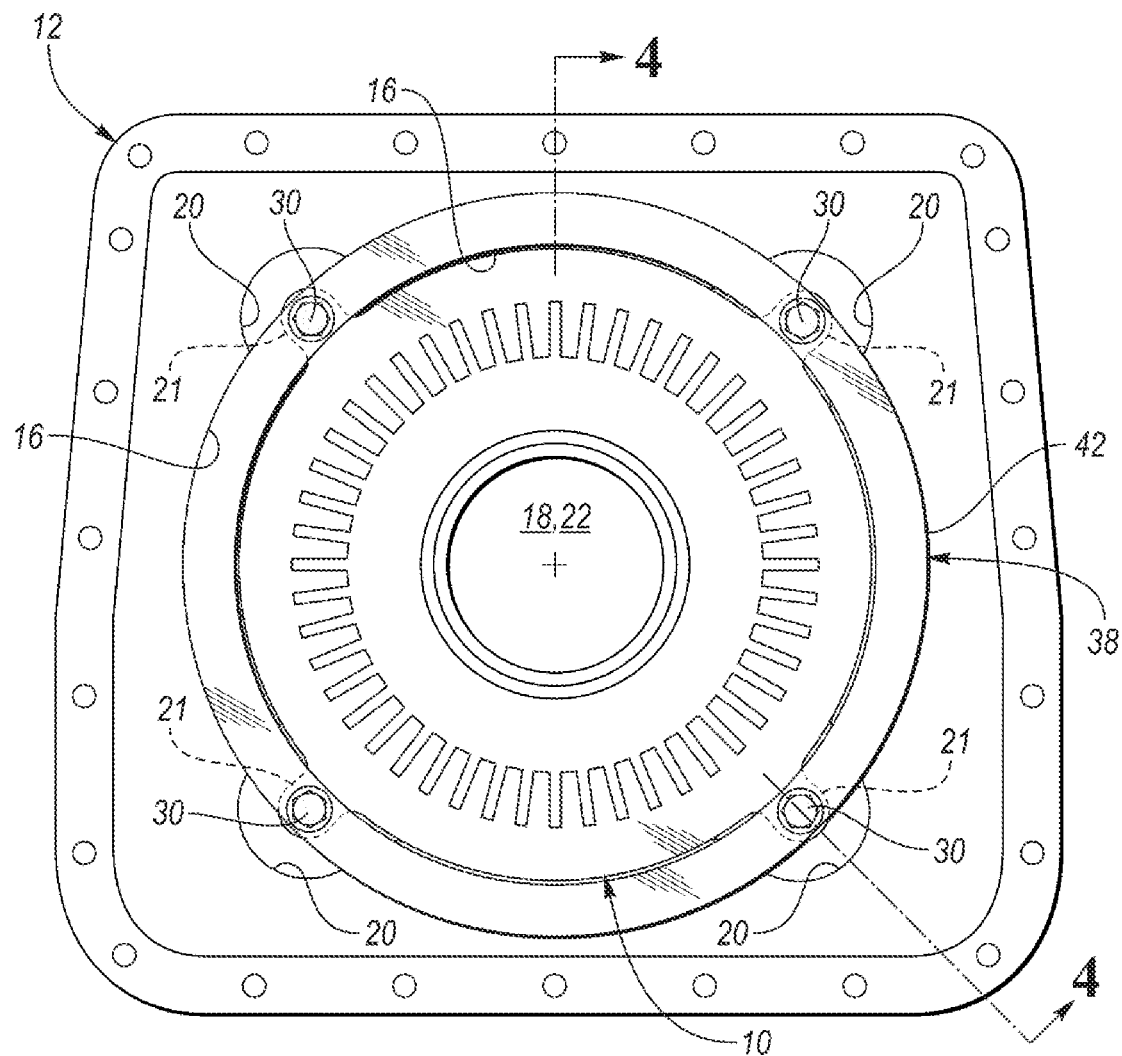
FIG. 3 is a front view of the electric machine stator that is disposed within the housing illustrating a second mounting arrangement for the electric machine stator.
Figure 4:
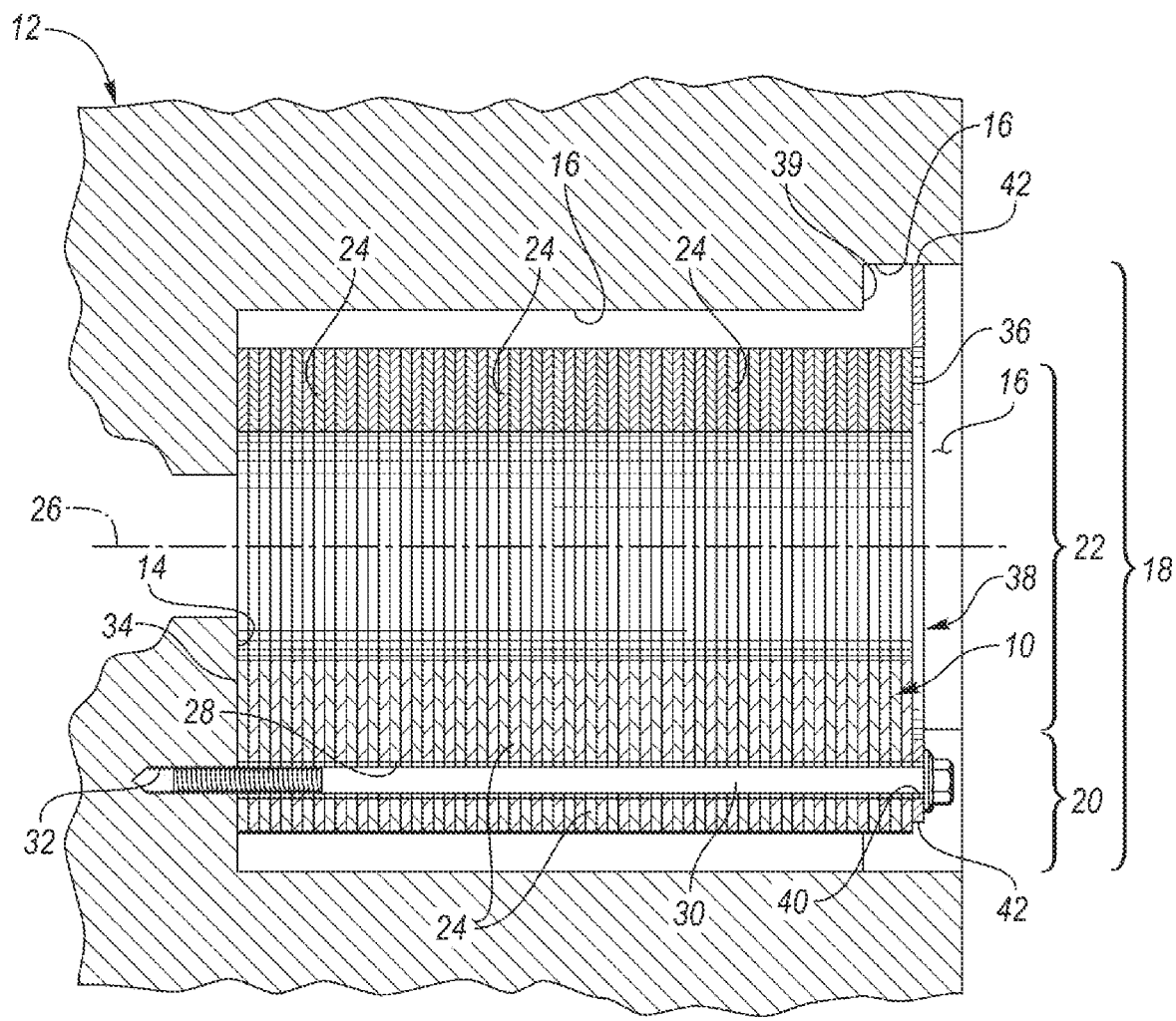
FIG. 4 is a cross-sectional view taken alone line 4-4 in FIG. 3.

Referring to FIGS. 3 and 4, a front view of the electric machine stator 10 that is disposed within the housing 12 and a cross-sectional view taken along line 4-4 in FIG. 3 are illustrated, respectively. More specifically, FIGS. 3 and 4 illustrate a second mounting arrangement for the electric machine stator 10, where the electric machine stator 10 is supported on both the longitudinal ends 34, 36 for the purpose of increasing stiffness to reduce or eliminate potential NVH issues. The second mounting arrangement depicted in FIGS. 3 and 4 also does not induce addition stress on the core of the electric machine stator 10 since the same number of fasteners 30 are utilized to secure the electric machine stator 10 to the housing 12 with respect to the first and/or conventional mounting arrangement, resulting in no additional compressive stress on the core of the electric machine stator 10. It should be understood that the components depicted in FIGS. 3 and 4 that were also depicted in FIGS. 1 and 2 will have the same properties, characteristics, functionality, etc. unless otherwise specifically stated herein.

In the second mounting arrangement for the electric machine stator 10, a support plate 38 is disposed within the cavity 18. The support plate 38 engages the internal side wall 16. The electric machine stator 10 is disposed between the support plate 38 and the internal rear wall 14 of the housing 12. The first longitudinal end 34 of the electric machine stator 10 may engage and/or may be secured to the internal rear wall 14 of the housing 12 while the second longitudinal end 36 may engage and/or may be secured to the support plate 38. The internal side wall 16 of the housing 12 may include a step 39. A perimeter or diameter of the cavity 18, which is defined by the internal side wall 16, may decrease in size along the step 39. More specifically, the perimeter or diameter of the cavity 18 may be smaller along an end of the housing 12 that is adjacent to the internal rear wall 14 relative to an opposing side of the housing 12 where the support plate 38 is disposed. The support plate 38 may engage the portion of the internal side wall 16 that defines the portion of the cavity 18 that has the larger perimeter or diameter.

Each of the plurality of fasteners 30 extends through the support plate 38, through the electric machine stator 10, and engages the second internal wall 14 of the housing 12 to secure the electric machine stator 10 to the housing 12 and within the cavity 18. The support plate 38 may define a second plurality of through holes 40 that are each configured to align with one of the plurality of through holes 28 defined in the laminate plates 24 of the electric machine stator 10, and to align with one of the plurality of tapped holes 32 defined in the rear wall 14 of the housing 12. Each of the fasteners 30 may extend through one of the through holes 40, one of the through holes 28, and engage the tapped holes 32 to secure the electric machine stator 10 to the housing 12 and within the cavity 18. More specifically, the fasteners 30 may secure the electric machine stator 10 to both the rear wall 14 of the housing 12 and the support plate 38 such that the electric machine stator 10 is "sandwiched" between the rear wall 14 of the housing 12 and the support plate 38 and such that the electric machine stator 10 is supported at both the first longitudinal end 34 and the second longitudinal end 36.

The support plate 38 and the internal side wall 16 of the housing 12 may form an interference-fit or press-fit engagement. More specifically, an external peripheral surface 42 of the support plate 38 may engage the internal side wall 16 of the housing 12 such that an interference-fit or press-fit is formed between the external peripheral surface 42 of the support plate 38 and the internal side wall 16 of the housing 12 (i.e., the external peripheral surface 42 of the support plate 38 may have a larger outer perimeter or outer diameter relative to the perimeter or diameter of the cavity 18 at the position where the external peripheral surface 42 engages the side wall 16 of the housing 12). The support plate 38 may be an annular ring and the external peripheral surface 42 may form the outer diameter of the annular ring. The interference-fit or press-fit engagement between the support plate 38 and the internal side wall 16 of the housing 12 prevents radial movement of the support plate 38 and second longitudinal end 36 of the electric machine stator 10 relative to the housing 12, which reduces or eliminates any NVH issues that may be produced by the electric machine stator 10.

In the second mounting arrangement, the first longitudinal end 34 of the electric machine stator 10 is anchored or grounded to the housing 12 via the fasteners 30 while the second longitudinal end 36 of the electric machine stator 10 is anchored or grounded to the housing 12 via the fasteners 30 and the support plate 38. Such a configuration, where both longitudinal ends 34, 36 of the electric machine stator 10 are anchored or grounded to the housing 12 eliminates or reduces the NVH issues that may arise when compared to anchoring or grounding the electric machine stator 10 to the housing 12 in a cantilevered fashion as depicted in FIGS. 1 and 2. It should be understood that the designations of first, second, third, fourth, etc. for through holes, walls, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle transaxle comprising:
   a housing having first and second internal walls that define a cavity, wherein the first internal wall is stepped such that the cavity has a first diameter at an opposing end of the housing relative to the second internal wall and a second diameter at a position that is adjacent to the second internal wall, wherein the first diameter is larger than the second diameter;
   an electric machine stator disposed within the cavity;
   a support plate disposed within the cavity at the opposing end of the housing relative to the second internal wall and engaging the first internal wall, wherein the stator is disposed between the support plate and the second internal wall, and disposed radially adjacent to the first and second diameter; and
   fasteners extending through the support plate and stator and engaging the second internal wall to secure the stator to the housing.

2. The vehicle transaxle of claim 1, wherein an external peripheral surface of the support plate engages the first internal wall such that an interference-fit is formed between the external peripheral surface and the first internal wall.

3. The vehicle transaxle of claim 1, wherein the first internal wall is cylindrical.

4. The vehicle transaxle of claim 3, wherein the first internal wall is substantially perpendicular to the second internal wall.

5. The vehicle transaxle of claim 4, wherein support plate is an annular ring having an external peripheral surface, and wherein the external peripheral surface engages the first internal wall.

6. The vehicle transaxle of claim 5, wherein an interference-fit is formed between the external peripheral surface and the first internal wall.

7. The vehicle transaxle of claim 1, wherein the support plate defines a first set of through holes, the stator defines a second set of through holes, and the second internal wall defines a set of tapped holes, and wherein each of fasteners extend through one of the through holes of the first set of through holes, one of the through holes of the second set of through holes, and engages one of the tapped holes to secure the stator to the housing.

8. A vehicle transmission comprising:
   a housing having internal rear and side walls that define a cavity, wherein the internal side wall is stepped such that the cavity has a first diameter at an opposing end of the housing relative to the internal rear wall and a second diameter at a position that is adjacent to the internal rear wall, wherein the first diameter is larger than the second diameter;
   an electric machine stator disposed within the cavity;
   a support plate disposed within the cavity at the opposing end of the housing relative to the internal rear wall and engaging the internal side wall such that a press-fit engagement is formed between the support plate and the internal side wall and
   such that the electric machine stator is disposed between the support plate and the internal rear wall, and disposed radially adjacent to the first and second diameter; and
   a plurality of fasteners extending through the support plate and stator and engaging the rear internal wall to secure the stator to the housing.

9. The vehicle transmission of claim 8,
   wherein a peripheral external surface of the support plate engages the internal side wall to form the press-fit engagement between the support plate and the internal side wall.

10. The vehicle transmission of claim 8, wherein the internal side wall is cylindrical.

11. The vehicle transmission of claim 10, wherein the internal rear wall is substantially perpendicular to the internal side wall.

12. The vehicle transmission of claim 11, wherein the support plate is an annular ring having an external peripheral surface, and wherein the external peripheral surface engages the internal side wall.

13. The vehicle transmission of claim 12, wherein the press-fit engagement is formed between the external peripheral surface and the internal side wall.

14. The vehicle transmission of claim 8, wherein the support plate defines a first set of through holes, the stator defines a second set of through holes, and the second internal wall defines a set of tapped holes, and wherein each of fasteners extend through one of the through holes of the first set of through holes, one of the through holes of the second set of through holes, and engages one of the tapped holes to secure the stator to the housing.

15. A vehicle transmission comprising:
    a stator and a support plate each disposed within a cavity defined by a transmission housing, wherein a first longitudinal end of the stator is secured to a first internal wall within the housing and a second longitudinal end of the stator is secured to the support plate, wherein an outer periphery of the support plate is secured to a second internal wall within the housing, wherein the second internal wall is stepped such that the cavity has a first diameter at an opposing end of the housing relative to the first internal wall and a second diameter at a position that is adjacent to the first internal wall, wherein the first diameter is larger than the second diameter, and wherein the support plate is disposed within the cavity at the opposing end of the housing relative to the first internal wall; and the stator is disposed radially adjacent to the first and second diameter.

16. The vehicle transmission of claim 15 further comprising a plurality of fasteners that extends through the support plate and stator and engage the first internal wall to secure the first longitudinal end of the stator to the first internal wall and to secure the second longitudinal end of the stator to the support plate.

17. The vehicle transmission of claim 15,
    wherein the outer periphery of the support plate is secured to the second internal wall within the housing via an interference-fit engagement.

18. The vehicle transmission of claim 15, wherein the second internal wall is cylindrical.

19. The vehicle transmission of claim 18, wherein the first internal wall is substantially perpendicular to the second internal wall.

20. The vehicle transmission of claim 19, wherein the support plate is an annular ring.

\* \* \* \* \*